United States Patent [19]
Kimura et al.

[11] Patent Number: 5,924,776
[45] Date of Patent: Jul. 20, 1999

[54] DIAGNOSIS APPARATUS FOR ANTI-LOCK BRAKING SYSTEM

[75] Inventors: Takashi Kimura, Fujisawa; Junsuke Ino, Tokyo, both of Japan

[73] Assignee: Nissan Motor Co., Ltd., Yokohama, Japan

[21] Appl. No.: 08/713,417

[22] Filed: Sep. 13, 1996

[30] Foreign Application Priority Data

Sep. 14, 1995 [JP] Japan .................................. 7-262602

[51] Int. Cl.⁶ ...................................................... B60T 8/00
[52] U.S. Cl. ...................................... 303/122.05; 303/199
[58] Field of Search ......................... 303/122.02–122.06, 303/199

[56] References Cited

U.S. PATENT DOCUMENTS

| | | | |
|---|---|---|---|
| 3,745,522 | 7/1973 | Inada et al. | 303/122.05 X |
| 4,494,801 | 1/1985 | Ohmori et al. | 303/20 X |
| 4,745,542 | 5/1988 | Baba et al. | 303/122.04 X |
| 5,735,583 | 4/1998 | Katayama et al. | 303/122.04 X |

FOREIGN PATENT DOCUMENTS

| | | | |
|---|---|---|---|
| 222047 | 5/1987 | European Pat. Off. | 303/122.05 |
| 58-152648 | 9/1983 | Japan | 303/122.05 |

*Primary Examiner*—Peter M. Poon
*Attorney, Agent, or Firm*—Foley & Lardner

[57] ABSTRACT

A diagnosis apparatus of solenoid drive circuits for an anti-lock braking system. In the diagnosis apparatus, each comparator outputs H-level signal to each counter in reply to the turning-on of a solenoid valve to reset and start the counter. When the counter counts a predetermined time TI, the counter outputs a carry signal to an OR gate and a diagnosis decision circuit where AND operation of two pairs of the outputs of the counters by each brake hydraulic unit is executed and OR operation of the outputs of the AND elements is execute. A select circuit receives a check signal indicative of a diagnosis executing mode and outputs the diagnosis result to a microcomputer for ABS control. Therefore, the diagnosis is collectively executed to all brake hydraulic systems without degrading the drivability of the vehicle.

14 Claims, 11 Drawing Sheets

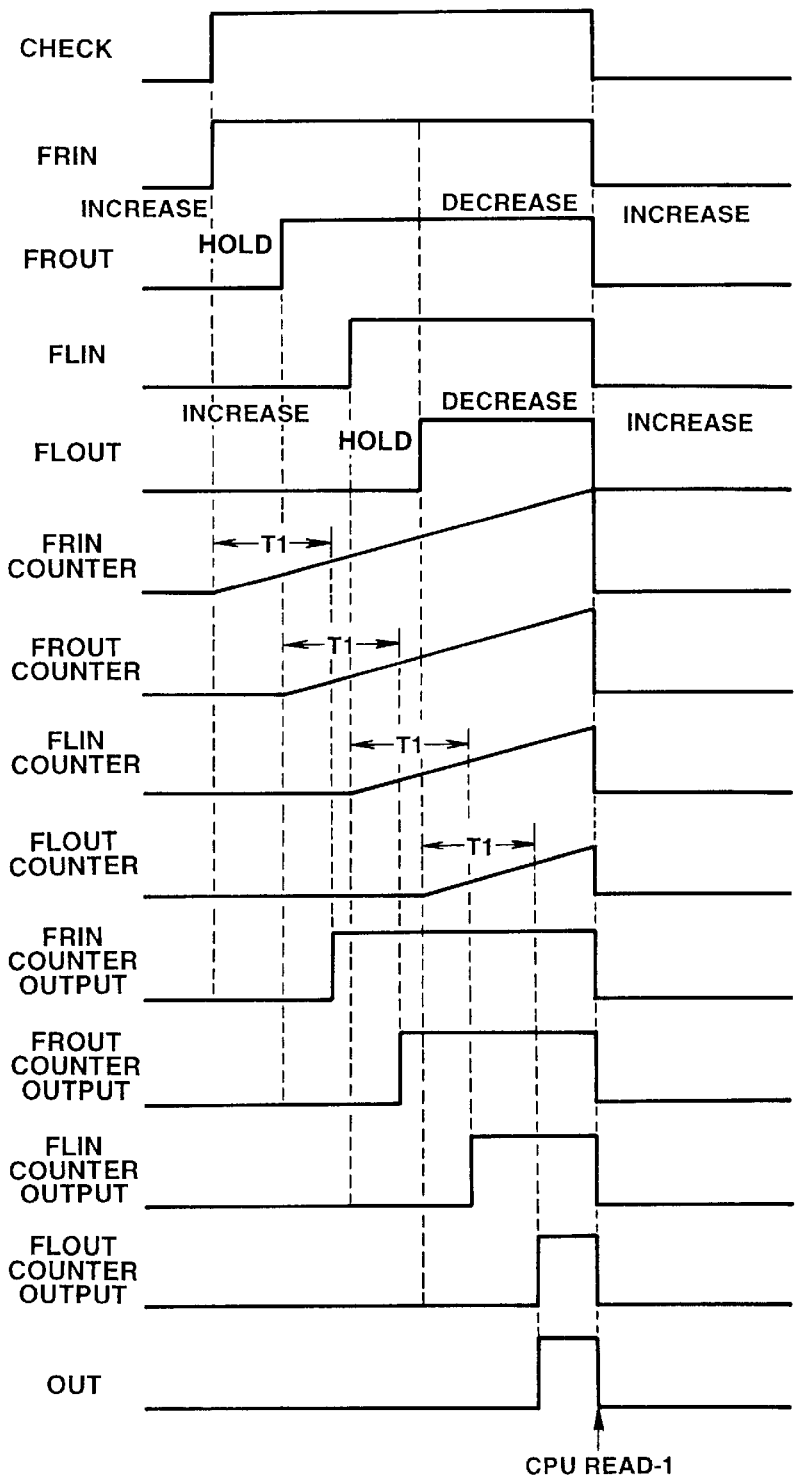

DIAGNOSIS APPARATUS FOR ANTI-LOCK BRAKING SYSTEM

BACKGROUND OF THE INVENTION

1. Field of the Invention

The present invention relates to a diagnosis apparatus for an anti-lock braking system, and more particularly to a diagnosis apparatus for diagnosing an operating condition of solenoid valves and drive circuits for use in an anti-lock braking system for an automotive vehicle.

2. Description of Related Art

Hitherto a variety of diagnosis apparatuses for solenoid drive circuits installed in an anti-lock brake system (ABS) have been researched. Such diagnosis apparatuses are arranged to diagnose an operating condition of a solenoid drive circuit for controlling a solenoid valve which is installed in a hydraulic system of the ABS. A diagnosis apparatus that could be installed in the ABS is shown in FIG. 7 where a diagnosis circuit is installed in an electronic control unit (ECU) 100 of the ABS. In FIG. 7, a part relating to one solenoid 300 is shown. By turning on and off a MOS transistor of a solenoid drive circuit 230, a solenoid electric-current flowed to the solenoid 300 is controlled. The relay 400 disposed upstream of the solenoid 300 is turned on and off according to the output of a relay drive circuit 240. By inputting a drain voltage of the solenoid drive circuit 230 through a noise filter 200 to an A/D port of the controller microcomputer 190, the voltage between a drain and a source of the MOS transistor is monitored to decide as to whether the breakage or short-circuit of the solenoid 300 is generated. When a solenoid monitoring circuit 210 is continuously set in a turned-on condition for more than a predetermined time period, it is decided that the solenoid 300 or the solenoid drive circuit 230 is abnormal and an abnormal signal indicative of the abnormality of the solenoid 300 or the solenoid drive circuit 230 is inputted to the control microcomputer 190. The control microcomputer 190 controls the relay drive circuit 240 through an AND circuit 220 on the basis of the decision signal and sets the solenoid 300 into an inoperative condition. The solenoid monitoring circuit 210 is arranged as shown in FIG. 8. Facilitating the explanation thereof, only a hydraulic pressure control of the front right and left wheels of the automotive vehicle will be discussed. In this Figure, FRIN denotes a hold solenoid valve of the front right wheel, FROUT denotes a decreasing solenoid valve of the front right wheel, FLIN denotes a hold solenoid valve of the front left wheel, and FLOUT denotes a decreasing solenoid valve of the front left wheel. The solenoid monitoring circuit 210 is constituted by a comparator 260 for monitoring a voltage of the MOS transistor of the solenoid drive circuit 230, a reference voltage generator 320 for generating a reference voltage, counters 270 for measuring each turning-on time of each solenoid 300, and an OR gate 280. The comparator 260 outputs at a H-level signal according to the turning-on of the solenoid 300 and starts a clock counting by each reset of the counters 270. When the counter value of one counter 270 reaches a predetermined time T1, a carry signal is outputted from the counter 270 and inputted to the OR gate 280. When one of the four solenoids 300 has kept on an on-condition for the predetermined time T1, an abnormality decision signal is outputted to an OUT terminal. Herein, the time T1 is set at a time period longer than a normal on-time in the normal ABS operation time, and if the solenoid 300 is set at an on-condition for more than the time period T1, an abnormality decision is outputted. A delay timer 340 shown in FIG. 7 does not promptly turn off the relay drive circuit 240 so that the control microcomputer 190 can have a sufficient time for reading the abnormal signal even if the abnormal signal is generated. Thus, in case that the operating condition of the solenoid 300 and its solenoid drive circuit 210 are diagnosed by simulatingly turning on the solenoid 300 and outputting an abnormal signal to the OUT terminal, the supply of the electric power to the solenoid 300 is stopped and the relay drive circuit 240 is turned off. Accordingly, the output voltage of the solenoid drive circuit 230 becomes set in an off condition. This generates troubles such that the control microcomputer 190 is turned off before the detection of the simulatingly outputted abnormal signal and that the relay 400 is frequently turned on-and-off during this diagnosis. Therefore, in order to avoid such troubles, the delay timer 340 is installed to the diagnosis apparatus.

However, this apparatus is still insufficient for a diagnosis of the operating condition of the solenoid and the solenoid drive circuit. That is, as shown in a time chart of FIG. 9, when the solenoid valve FRIN is turned on by a long pulse which is longer than a time period T1 as shown in FIG. 9(a), the counter value of the FRIN counter 270 is counted up as shown in FIG. 9(e). When the counter value becomes greater than the time period T1, a carry signal is outputted from the counter 270 and a pulse signal indicative of the abnormality is outputted to an OUT terminal as shown in FIG. 9(i). The control microcomputer 190 executes diagnosis by detecting the pulse signal indicative of the abnormality, when the counter value of the FRIN counter 270 becomes greater than the time period T1. That is, the control microcomputer 190 detects as to whether the abnormal signal is outputted to the OUT terminal by continuously turning on the solenoid 300 for more than the predetermined time T1. If normal, the solenoid valve FRIN is set at H-level and then a H-level signal is outputted to the OUT terminal after a predetermined time elapsed. If abnormal, a L-level signal is outputted to the OUT terminal. The diagnosis as to the operating conditions of the solenoid 300 and the drive circuit 230 is executed by this signal output to the OUT terminal. Although the above mentioned diagnosis is executed for one solenoid 230, if it is executed by shifting it at predetermined intervals as shown in FIG. 9(b), FIG. 9(c) and FIG. 9(d), the respective counters 270 count as shown in FIG. 9(e), FIG. 9(f), FIG. 9(g) and FIG. 9(h). Therefore, the OUT terminal outputs four abnormal signals corresponding to diagnosis pulses as shown in FIG. 9(i). The control microcomputer 19 diagnoses as to whether all solenoids 300 and the solenoid drive circuits 230 thereof are operated normally, by reading the four signals.

However, this method has a problem that the diagnosis takes relatively long time since the time TI for counting up the counter is normally set at several seconds. The hydraulic pressure of a wheel cylinder of the brake hydraulic system is deviated in the order of pressure increase, hold, increase, non-set and increase as shown in FIG. 9. That is, it was necessary to operate a non-set mode which is not normally used and where only pressure decreasing solenoid valves shown by FROUT and FLOUT are turned on. Further, in order to solve the later mentioned problem, a solenoid monitor circuit 210 of a diagnosis apparatus has been proposed as shown in FIG. 10. The solenoid monitor circuit 210 further includes an AND gate 290 which is set at H by the carry signals of the counters 270 and a select circuit 330 which selects one of the output of the OR gate 280 and the output of the AND gate 290 by checking the selection signal from the control microcomputer 190, in addition to the solenoid monitoring circuit of FIG. 8. The solenoid monitoring circuit 210 enables the execution of the diagnosis without taking the non-set mode. The diagnosis circuit using the monitoring circuit 210 has a structure as the same as that shown in FIG. 7. The operation of solenoid monitoring circuit 210 is shown by a time chart of FIG. 11. During diagnosis, the control microcomputer 190 sets the select circuit 330 so as to select an output side of the AND gate 290 by setting a CHECK signal at a H-level as shown in FIG. 11(n). Next, the solenoids are, in turn, turned on as shown in FIG. 11 (a) to FIG. 11(d). With these turning on, the counters 270 are, in turned, counted up as shown in FIG. 11(e) to FIG. 11(h). Carry signals are outputted from the counters 270 which took a value greater than the predetermined time T1. When four carry signals are inputted to the AND gate 290 and when all counters 270 finished the counting of the predetermined time, a H-level signal is outputted to the OUT terminal. The OUT terminal is monitored by the control microcomputer 190. If at least one of the counters 270 is not operated, the AND gate 290 does not take H-level. Therefore, it becomes possible to diagnose all counters 270 by this operation. Since the wheel cylinder hydraulic pressure is deviated in the order of pressure increase, hold, decrease, and increase by flowing electric power to the solenoid, the hydraulic system is not set at the non-set mode during the diagnosis.

However, since in the pressure decrease condition the solenoid valves of the front two wheels are turned on as shown in FIG. 11(b) and FIG. 11(d), such proposed diagnosis apparatus causes a problem such that it cannot be adapted to a requirement of the control side that only one wheel is admitted to be set at a pressure decrease mode during the diagnosis, that is, during the ABS inoperative condition.

SUMMARY OF THE INVENTION

It is an object of the present invention to provide an improved diagnosis apparatus which enables a collective diagnosis of a plurality of hydraulic units of an anti-lock braking system while avoiding a plural hydraulic units from being simultaneously set in a pressure decrease mode.

A first aspect of the present invention resides in an anti-lock braking system. The anti-lock braking system comprises a brake hydraulic unit, a pair of solenoid drive circuits, a holding-valve counter, a decreasing-valve counter, and a decision circuit. The brake hydraulic unit includes a holding solenoid valve which holds hydraulic pressure of the brake hydraulic unit and a decreasing solenoid valve which decreases the hydraulic pressure of the brake hydraulic unit. The solenoid drive circuits are connected to the holding solenoid valves and the decreasing solenoid valves respectively. The solenoid drive circuits put the holding solenoid valve and the decreasing solenoid valve in a turned-on condition respectively. The holding-valve counter is connected to the holding solenoid valve and counts a turned-on time of the holding solenoid valve. The holding-valve counter outputs a holding-valve signal when the turned-on time of the holding solenoid valve is greater than a predetermined time. The decreasing-valve counter is connected to the decreasing solenoid valve and counts a turned-on time of the decreasing solenoid valve. The decreasing-valve counter outputs a decreasing-valve signal when the turned-on time of the decreasing solenoid valve is greater than the predetermined time. The decision circuit receives the holding valve signal and the decreasing valve signal. The decision circuit generates a decision signal when both of the holding-valve signal and the decreasing-valve signal are inputted to the decision circuit.

A second aspect of the present invention resides in an anti-lock braking system which comprises a plurality of brake hydraulic units, a plurality of solenoid drive circuits, a plurality of holding-valve counters, a plurality of decreasing-valve counters, and a decision circuit. Each of the brake hydraulic units includes a holding solenoid valve which holds hydraulic pressure of each brake hydraulic unit and a decreasing solenoid valve which decreases the hydraulic pressure of each brake hydraulic unit. The solenoid drive circuits are connected to the holding solenoid valves and the decreasing solenoid valves respectively. Each of the solenoid drive circuits puts each of the holding solenoid valves and the decreasing solenoid valves in a turned-on condition respectively. The holding-valve counters are connected to the holding solenoid valves respectively. Each of the holding-valve counters counts a turned-on time of the holding solenoid valve. The holding-valve counter outputs a holding-valve signal when the turned-on time of the holding solenoid valve is greater than a predetermined time. The decreasing-valve counters are connected to the decreasing valves respectively. Each of the decreasing-valve counters counts a turned-on time of the decreasing solenoid valve. The decreasing-valve counter outputs a decreasing-valve signal when the turned-on time of the decreasing solenoid valve is greater than the predetermined time. The decision circuit receives the holding valve signal and the decreasing valve signal. The decision circuit generates a decision signal when both of the holding-valve signal and the decreasing-valve signal by each associated brake hydraulic unit are inputted to the decision circuit.

A third aspect of the present invention resides in a method for diagnosing an anti-lock braking system. The method comprises the steps of (a) applying a diagnosing signal to solenoid drive circuits for a holding solenoid valve and a decreasing solenoid valve of a brake hydraulic unit so that the holding solenoid valve and the decreasing solenoid valve are turned on for more than a predetermined time; (b) counting the turned-on time of each of the holding solenoid valve and the decreasing solenoid valve; (c) generating a first carry signal when the holding solenoid valve is turned on for more than the predetermined time; (d) generating a second carry signal when the decreasing solenoid valve is turned on for more than the predetermined time; and (e) outputting a decision signal indicative of a normality of the brake hydraulic unit when both of the first and second carry signals are generated.

BRIEF DESCRIPTION OF THE DRAWINGS

FIGS. 11(a) to 11(n) are time charts showing operations of the related solenoid monitoring circuit of FIG. 10.

DETAILED DESCRIPTION OF THE INVENTION

Referring to FIGS. 1 to 5, there is shown a first embodiment of a diagnosis apparatus of solenoid drive circuits 23 applied to an anti-lock braking system (ABS) for an automotive vehicle.

Figure 3:
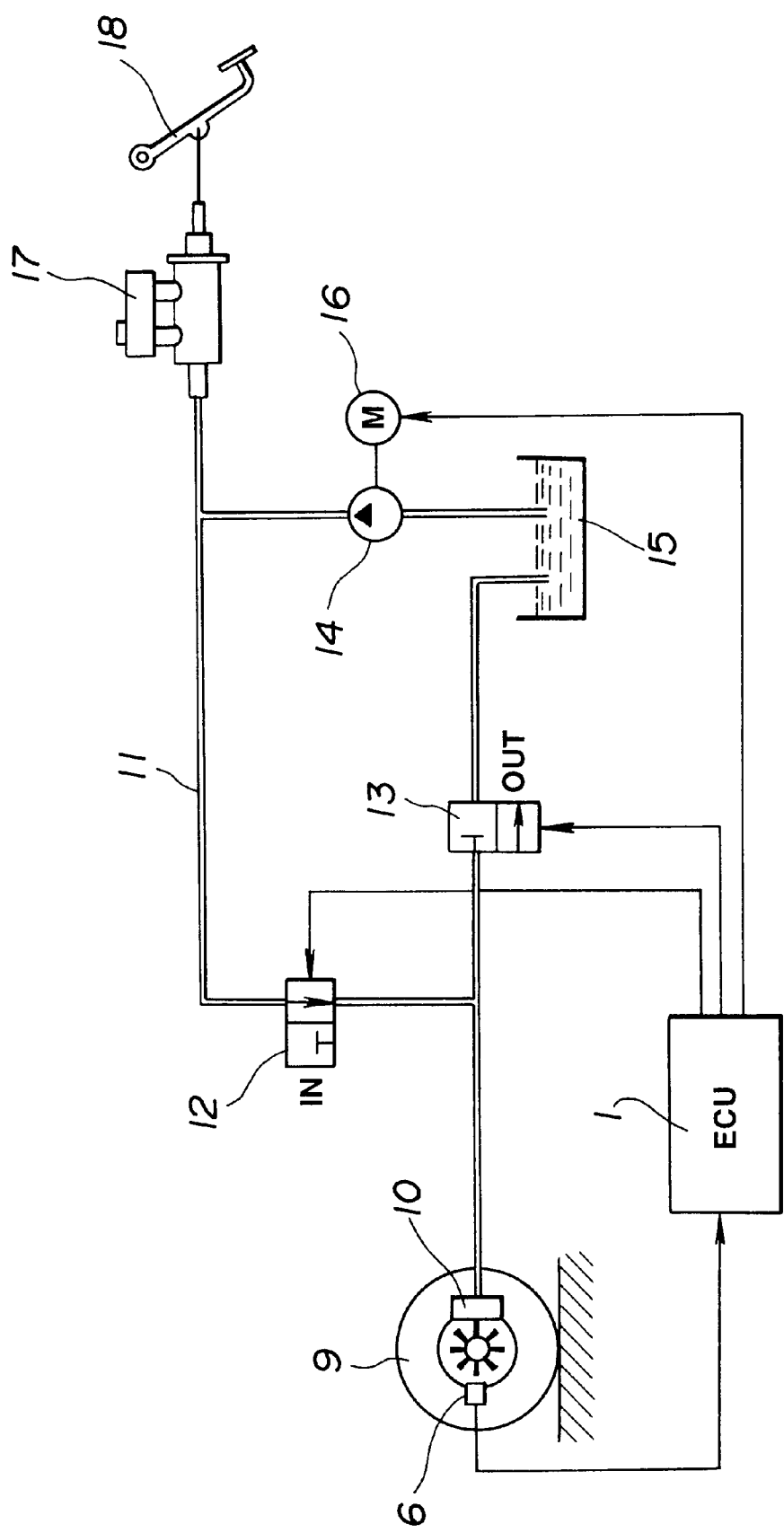
FIG. 3 is a system diagram of an anti-lock braking system to which the diagnosis apparatus according to the present invention is applied.

The first embodiment of the diagnosis apparatus according to the present invention is installed to the ABS shown in FIG. 3. The ABS of FIG. 3 shows one hydraulic system for one of a front-right wheel (FR), a front-left wheel (FL) and rear wheels (RR). The diagnosis apparatus is arranged to diagnose the operation of the solenoid drive circuit 23 through which a control microcomputer 19 controls each solenoid 3 of each of first and second solenoid valves 12 and 13 installed in each brake hydraulic unit of the ABS. The ABS is arranged to generate hydraulic brake pressure in a master cylinder 17 by depressing a brake pedal 18 and to transfer this hydraulic pressure to a wheel cylinder 10 through a brake conduit 11. The first solenoid valve 12 of a normal open type is disposed between the brake conduit 11 and a wheel cylinder 10 and is arranged to stop a transferring of hydraulic pressure to the wheel cylinder 10 by turning-on a first solenoid 3 of the first solenoid valve 12 according to a signal from an electronic control unit (ECU) 1. A drain passage for draining brake fluid to a reservoir tank 15 communicates the wheel cylinder 10 and the reservoir tank 15. The second solenoid valve 13 of a normal closed type is disposed in the drain passage so that the drain passage is opened by turning-on the solenoid valve 13 according to a signal from the ECU 1. Brake fluid in the reservoir tank 15 is returned to the master cylinder 17 by means of a pump 14 which is driven by a motor 16. The motor 16 is controlled by the ECU 1 so as to operate only during the operation of the ABS which operation functions to always fill the brake conduit 11 with brake fluid. A wheel speed sensor 61 (62, 63) is installed to a wheel 9 and outputs a wheel speed signal to the ECU 1. Under an ABS mode, the ECL 1 executes the ABS control to prevent wheels from locking in a manner to adjust hydraulic pressure in the wheel cylinder 10 through an on-and-off control of the solenoid valves 12 and 13 upon detecting a change of a slipping ratio (indicating a lock condition) from the wheel speed.

In this ABS control, the first and second solenoid valves 12 and 13 take several conditions. In a first mode, that is, in a pressure increase mode, the first solenoid valve 12 is turned off, and the second solenoid valve 13 is turned off. This first mode is similar to a normal braking mode wherein hydraulic pressure from the master cylinder 17 is transferred to the wheel cylinder 10 by opening the first solenoid valve 12 and closing the second solenoid valve 13. In a second mode, the first solenoid valve 12 is turned on and the second solenoid valve 13 is turned off. That is, both the first and second solenoid valves 12 and 13 are closed, and therefore the hydraulic pressure from the master cylinder 17 is not transferred to the wheel cylinder 10 and the pressure of the wheel cylinder 10 is held. In a third mode, that is, in a pressure decrease mode, both the first and second solenoid valves 12 and 13 are turned on. Therefore, the first solenoid valve 12 is closed and the second solenoid valve 13 is opened. The hydraulic pressure in the wheel cylinder 10 is decreased since the brake fluid in the wheel cylinder 17 is drained to the reservoir tank 15. Further, in a non-set mode, the first solenoid valve 12 is turned off and the second solenoid valve 13 is turned on. This non-set mode is not applied to the ABS control since in this condition both first and second solenoid valves 12 and 13 are opened to drain the brake fluid from the master cylinder 17 to the drain tank 15 and therefore the brake hydraulic pressure is indefinite.

Three sets of the above-mentioned brake hydraulic units of the ABS are installed to a rear-wheel drive automotive vehicle as the sum of two sets for front wheels and one set for rear wheels, respectively. Therefore, the sum of the solenoid valves 12 and 13 for one automotive vehicle is commonly six.

Figure 4:
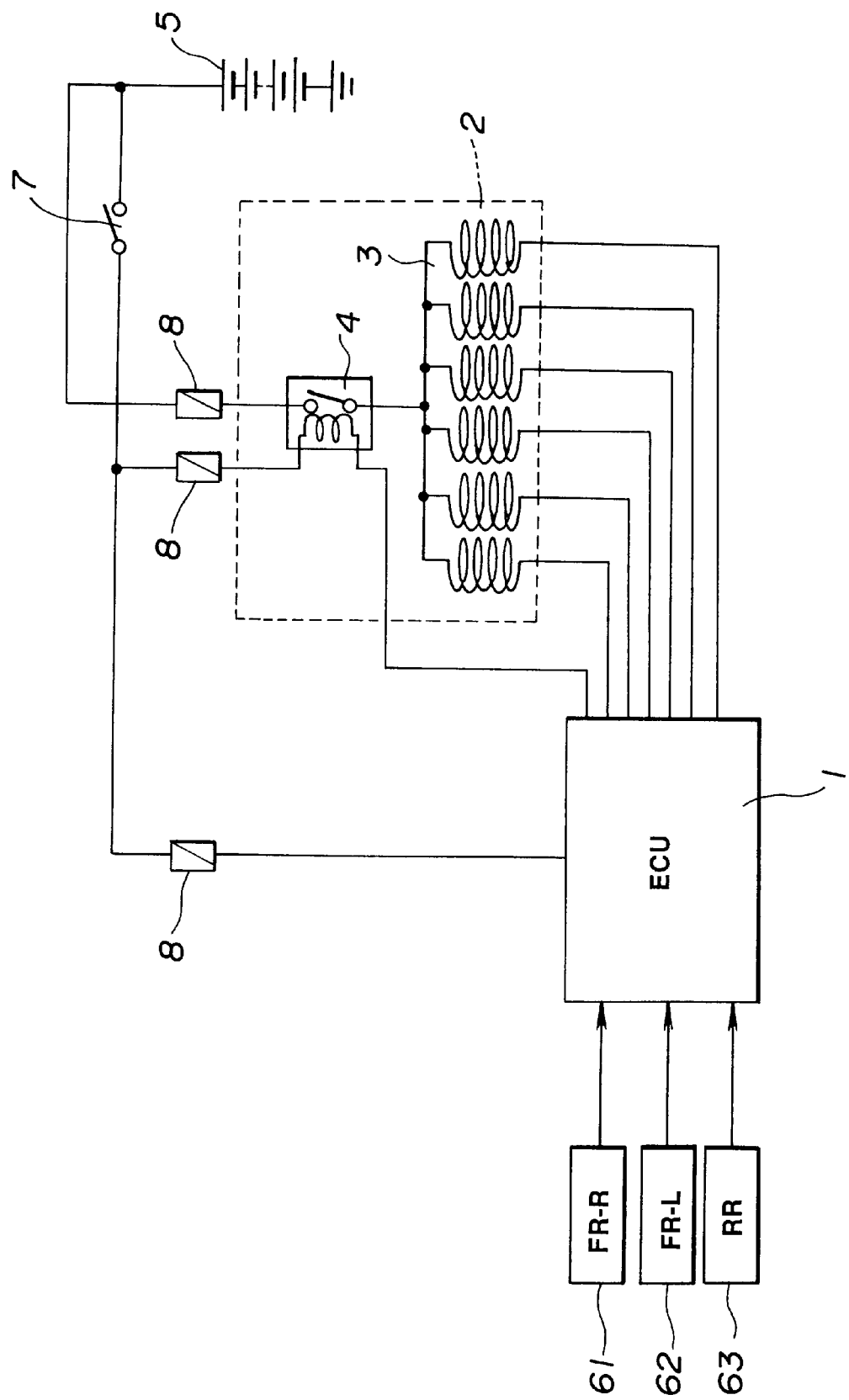
FIG. 4 is a view showing an electrical connection of the anti-lock braking system of FIG. 3.

FIG. 4 shows an electric system diagram of the ABS. A battery unit 5 is connected to a hydraulic unit (HU) 2 and the ECU 1 through respective fuses 8. The HU 2 includes six solenoids 3 for the three sets of the first and second solenoid valves 12 and 13 which are respectively connected to the ECU 1 and respectively execute transferring and cutting of hydraulic pressure. Upstream sides of the solenoids 3 are combined and connected to a relay 4 whose upstream side is connected to the battery unit 5. The relay 4 is controlled by the ECU 1 and is normally set at ON in a key-on condition. A switch 7 controls the supply of electric power to the ECU 1.

First, second and third wheel speed sensors 61, 62 and 63 are installed to a front right wheel (FR-R), a front left wheel (FR-L) and a rear wheel (RR), respectively. The ECU I controls the brake hydraulic pressure of the wheel cylinder 10 by detecting the change of the slipping ratio of the wheel from the signals of the wheel speed sensors 61, 62 and 63 and by controlling the HU 2. When the ECU 1 detects the abnormality of the ABS, the ECU 1 changes the operation mode from the ABS control to the normal operation mode by turning off the relay 4 and by stopping the supply of electric power to the solenoids 3.

Figure 1:
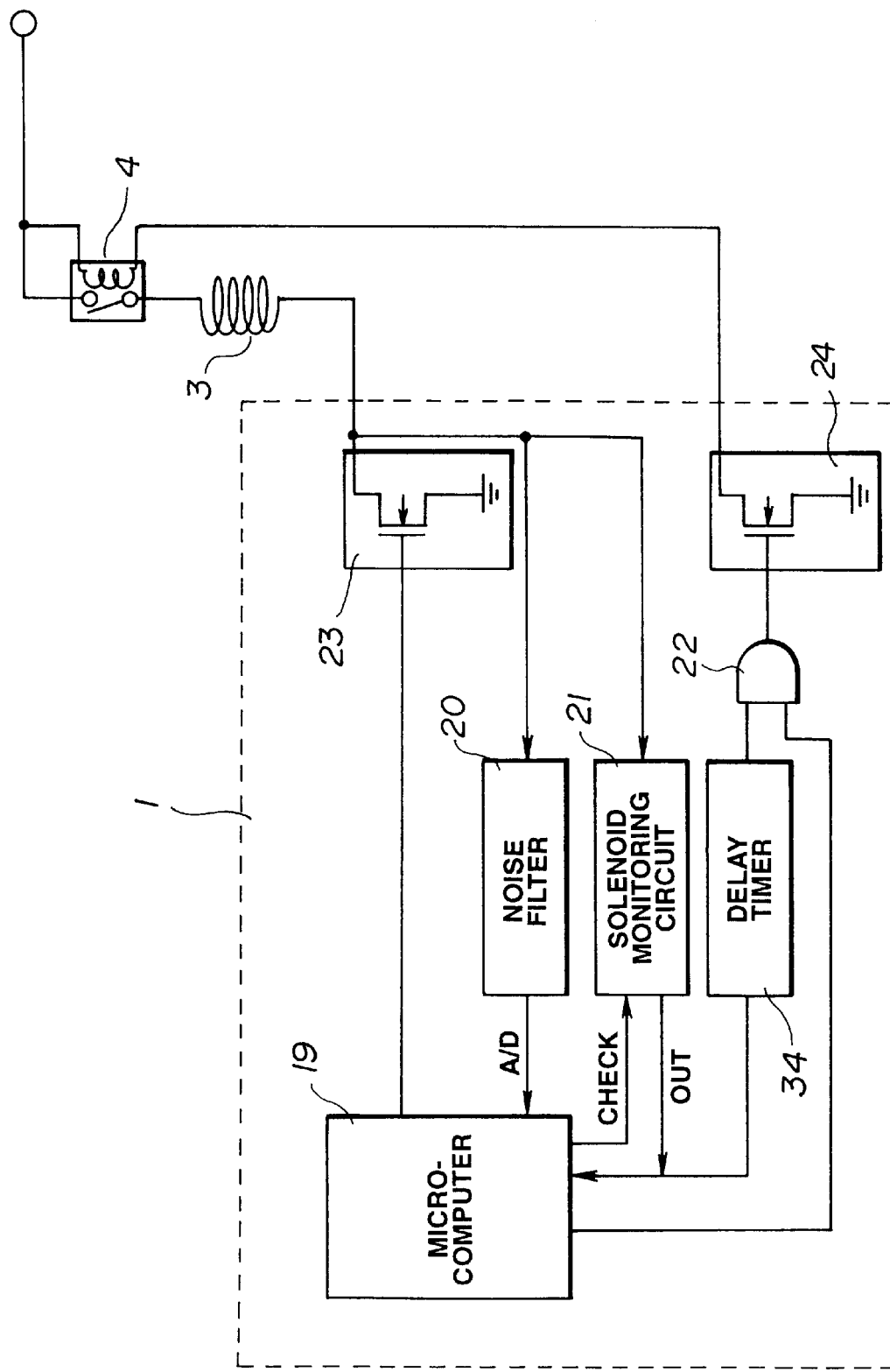
FIG. 1 is a block diagram of an electronic control unit including a first embodiment of a diagnosis apparatus according to the present invention circuit.

As shown in FIG. 1, the diagnosis apparatus according to the present invention comprises a control microcomputer 19 to which the solenoid drive circuit 23, a noise filter 20, a solenoid monitoring circuit 21 and a delay timer 34 are connected. When a diagnosis is executed, the control microcomputer 19 outputs a diagnosis signal to the solenoid drive circuit 23 and outputs a check signal to the solenoid monitoring circuit 21. The solenoid monitoring circuit 21 generates an OUT signal on the basis of a response of each solenoid drive circuit 23. The control microcomputer 19 reads the OUT signal and decides as to whether the operation of the solenoids 3 and the solenoid drive circuits 23 are normal or not. When it is decided that the operations are not normal, the relay 4 is operated through a delay timer 34, an AND calculator 22 and a relay drive circuit 24 so as to stop flowing electric current to the solenoid 3 in order to stop the ABS control. The delay timer 34 is similar to that applied to a conventional apparatus mentioned in the background of the invention.

Figure 2:
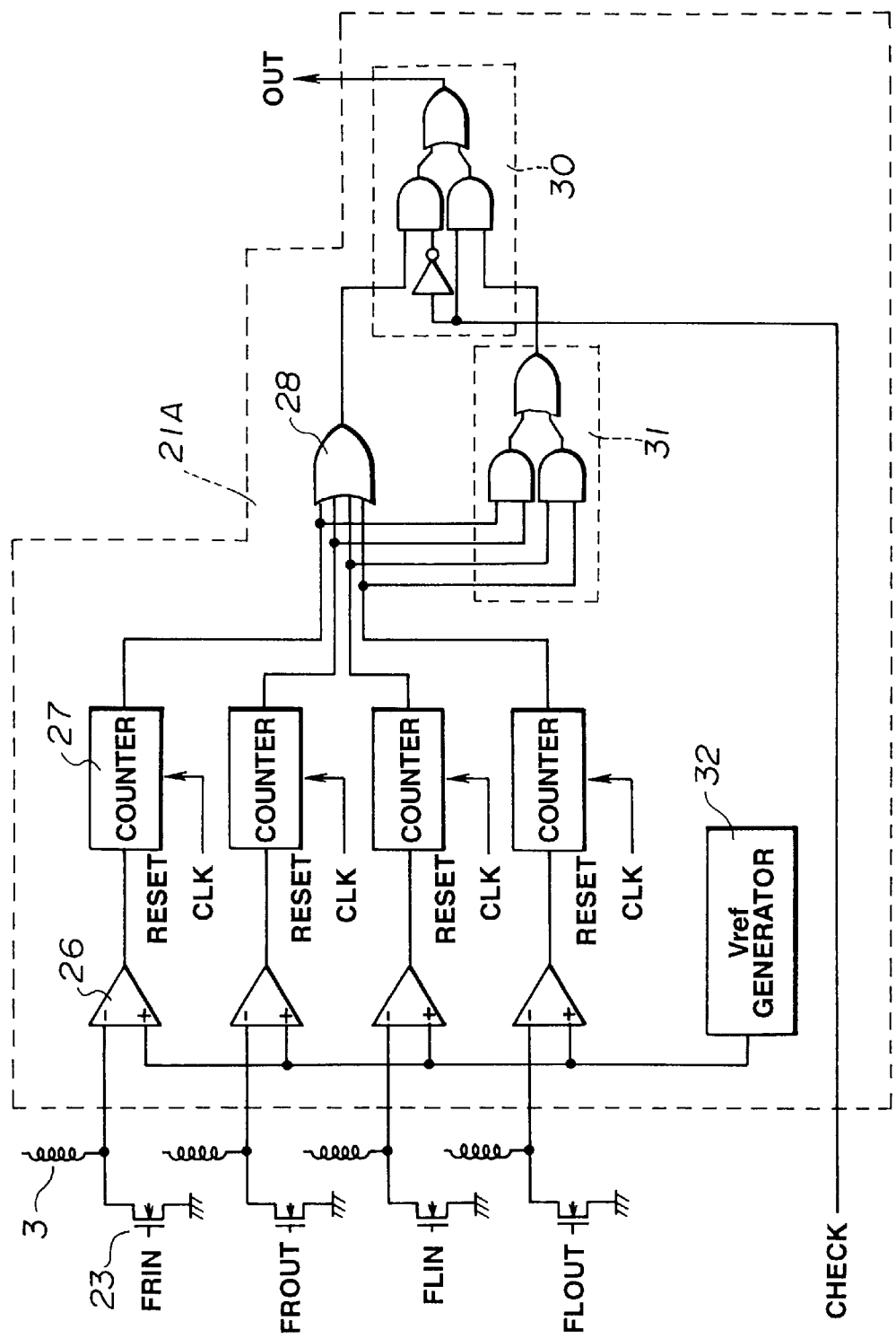
FIG. 2 is a block diagram of a solenoid monitoring circuit of the diagnosis apparatus.

FIG. 2 shows a block diagram showing a detailed structure of the solenoid monitoring circuit 21. Each comparator 26 monitors a drive voltage of each solenoid 3 on the basis of the output voltage of a reference voltage generator 32. When the solenoid 3 is turned on, the comparator 26 outputs a H-level signal. Then, each counter 27 is reset and starts clocking (counting). When the counter value of the counter 27 reaches a predetermined time T1, the counter 27 outputs a carry signal. When at least one of the four counters 27 outputs a carry signal, an OR gate 28 decides that the operation of the solenoid drive circuit 23 is abnormal and outputs a signal to an OUT output terminal through a select circuit 30. Herein, the predetermined time T1 is set to be greater than a time period that the ABS control is operated (ON time), and the control microcomputer 19 decides that it is abnormal when the on-time of each solenoid 3 becomes greater than the time T1.

A diagnosis decision circuit 31 receives the carry signals of the respective counters 27 and executes an AND operation by each brake hydraulic system, such as AND operation of the outputs of the FRIN counter and the FROUT counter and AND operation of the outputs of the FLIN counter and the FLOUT counter. Then, the respective outputs of AND elements are inputted to an OR gate to execute an OR operation. The calculated result is outputted to a select circuit 30. The select circuit 30 has previously received a check signal indicative that the diagnosis mode is selected. The diagnosis signal of each brake hydraulic system is outputted from the OUT terminal and inputted to the control microcomputer 19. The control microcomputer 19 outputs an operation signal to the relay drive circuit 24 when abnormality is detected from the diagnosis signal. The select circuit 30 is constituted by a NOT element, two AND elements and an OR gate. The output of the OR gate 28 and the opposite of the CHECK signal by the NOT element is inputted to a first AND element, and the output of the diagnosis decision circuit 31 and the CHECK signal are inputted to a second AND element. The outputs of the first and second AND elements are inputted to the OR gate.

Next, the diagnosis operation of the diagnosis apparatus according to the present invention will be discussed hereinafter with reference to a time chart of FIG. 5.

Figure 5:
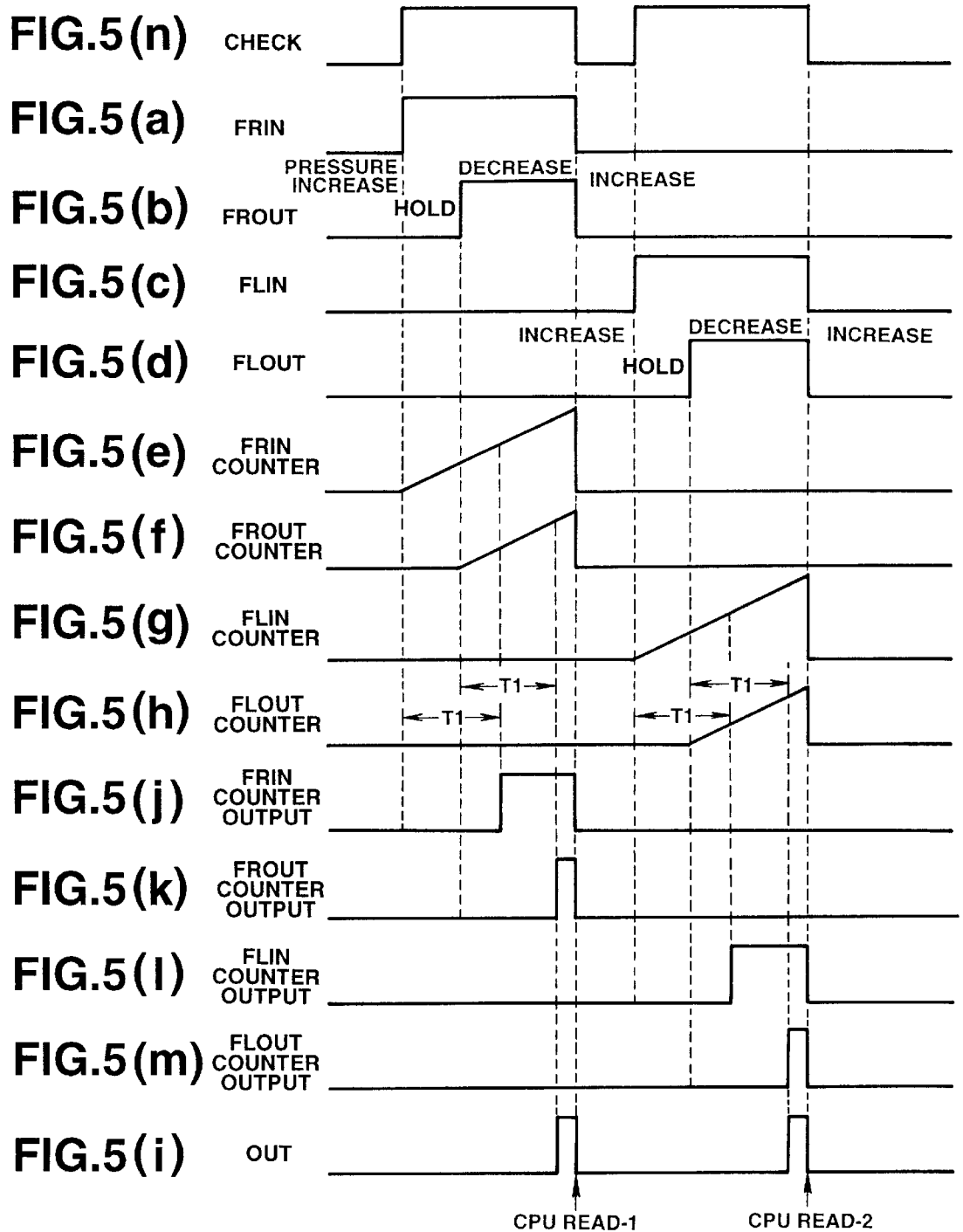
FIGS. 5(a) to 5(n) are time charts showing operations of a solenoid drive circuit of the anti-lock braking system.

The microcomputer 19 sets the CHECK signal at a H-level as shown in FIG. 5(*n*) so that the select circuit 30 selects an output of the diagnosis decision circuit 31. Next, the solenoids FRIN (a solenoid of the first solenoid valve 12 of the front right wheel) and FROUT (a solenoid of the second solenoid valve 13 of the front right wheel) of the brake hydraulic system for a right side wheel are, in turn, turned on as shown in FIG. 5(*a*) and FIG. 5(*b*). With this operations, the counters are, in turn, counted up as shown in FIG. 5(*j*) and FIG. 5(*k*). The diagnosis decision circuit 31 is set to output H-level signal to the OUT terminal at a time that the two counters finished a predetermined count. The microcomputer 19 monitors a level of the OUT terminal during when the CHECK signal is set at H-level. That is, when H-level is kept until a time of the execution of a CPU read-1 (where the control unit executes first reading), it is decided that the solenoid monitoring circuit 21 is normal. When L-level signal is detected at the time of the execution of the CPU read-1, it is decided that the solenoid monitoring circuit 21 is not normal. The above-mentioned diagnosis is similarly executed as to the solenoids FLIN (a solenoid of the first solenoid valve 12 of the front left wheel) and FLOUT (a solenoid of the second solenoid valve 13 of the front left wheel) of the brake hydraulic system for a left side wheel and an output of the OUT terminal until a CPU read-2 time is monitored. The hydraulic pressure in the wheel cylinder 10 is deviated in the order of increase, hold, decrease and increase as shown in FIG. 5. Further, the diagnosis is integrally executed by each brake hydraulic system. Therefore, the front two wheels are never simultaneously put in a pressure decrease mode. This enables the diagnosis to be executed without degrading the driving stability of the vehicle.

Although the first embodiment of the diagnosis apparatus according to the present invention has been shown and described in case that three hydraulic channels are used, it will be understood that this diagnosis apparatus may be applied to a case of four wheels to which four hydraulic system are applied.

Figure 6:
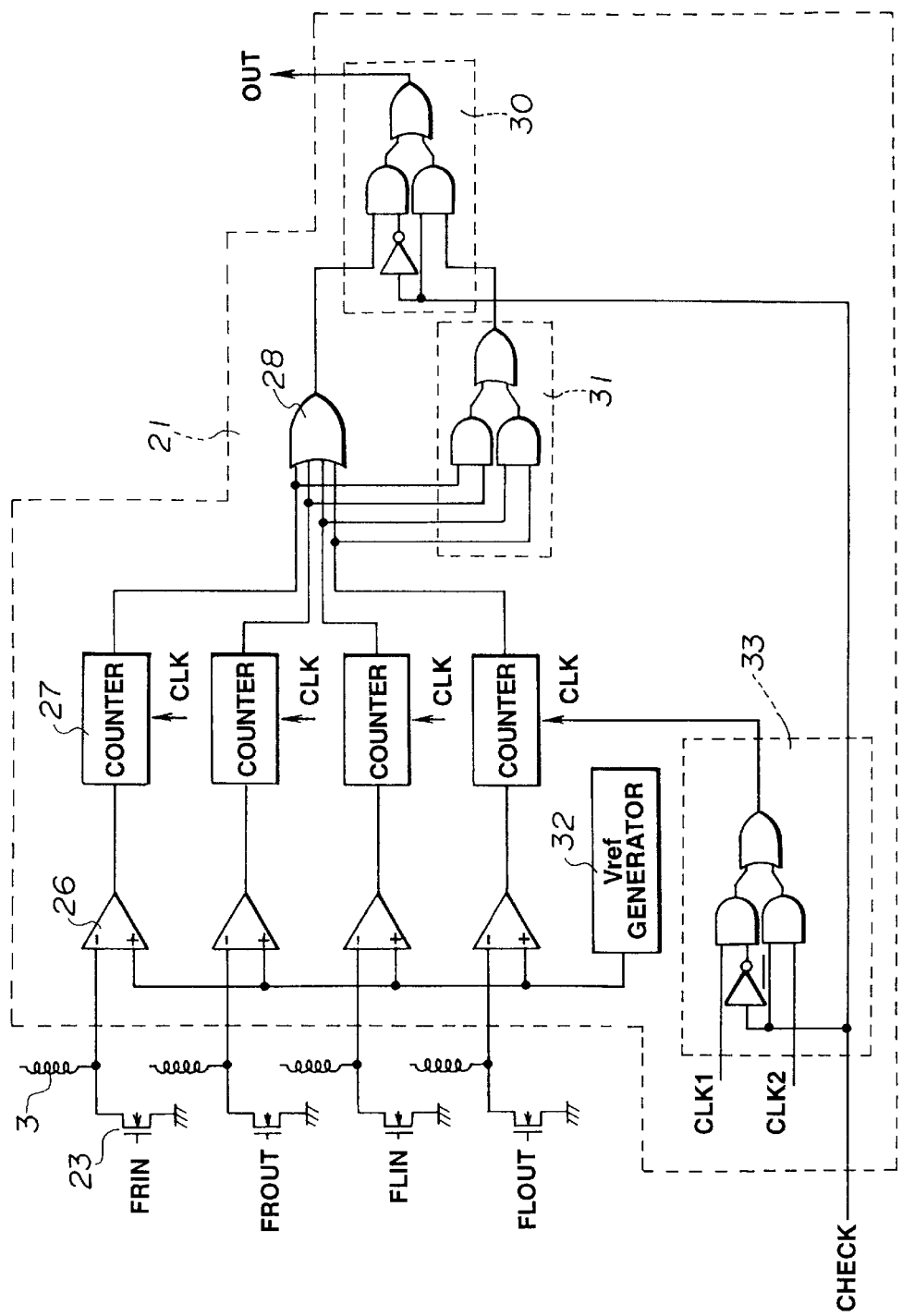
FIG. 6 is a block diagram of another solenoid monitoring circuit.
Figure 7:
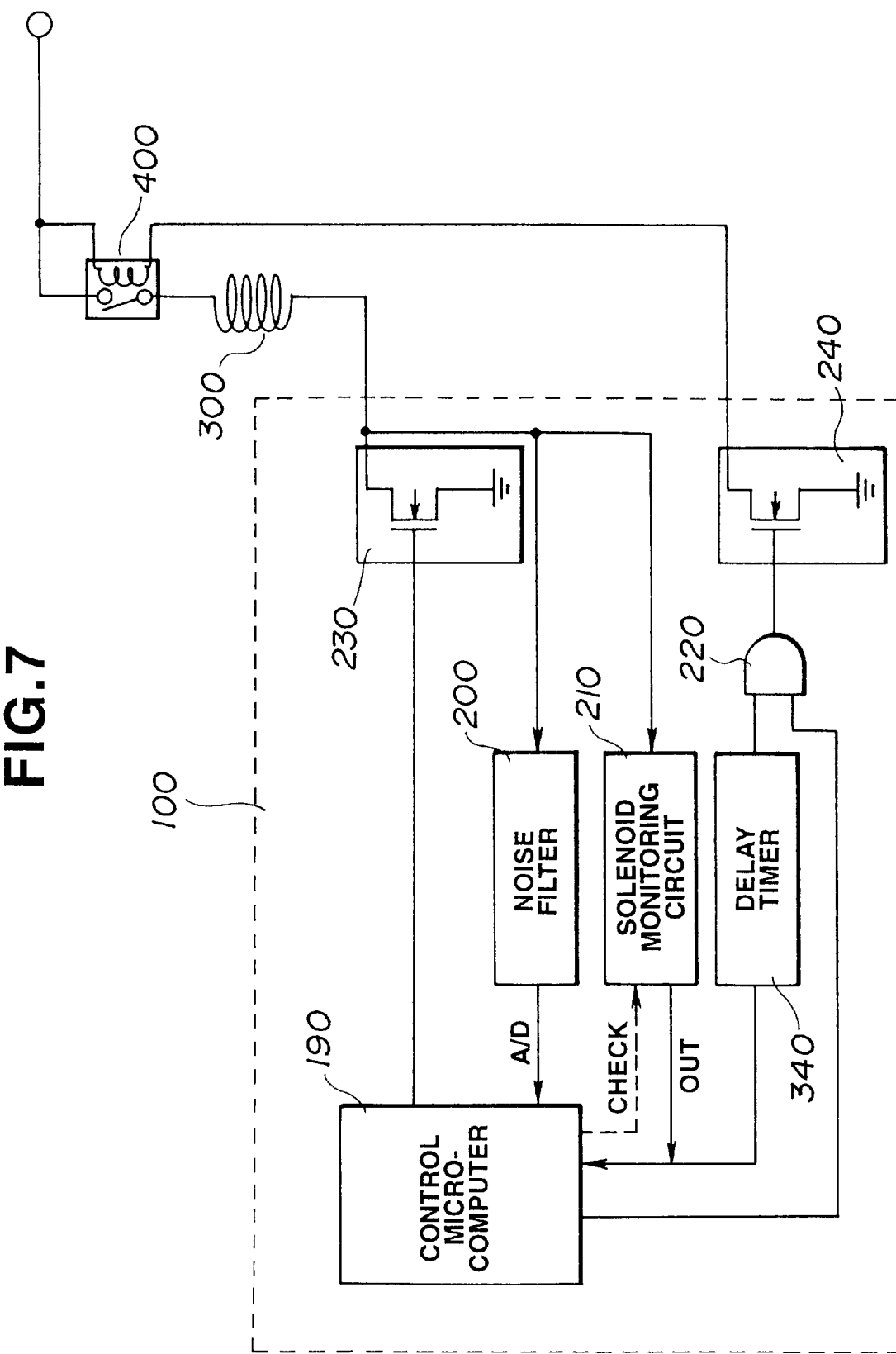
FIG. 7 is a block diagram of a related electronic control unit.
Figure 8:
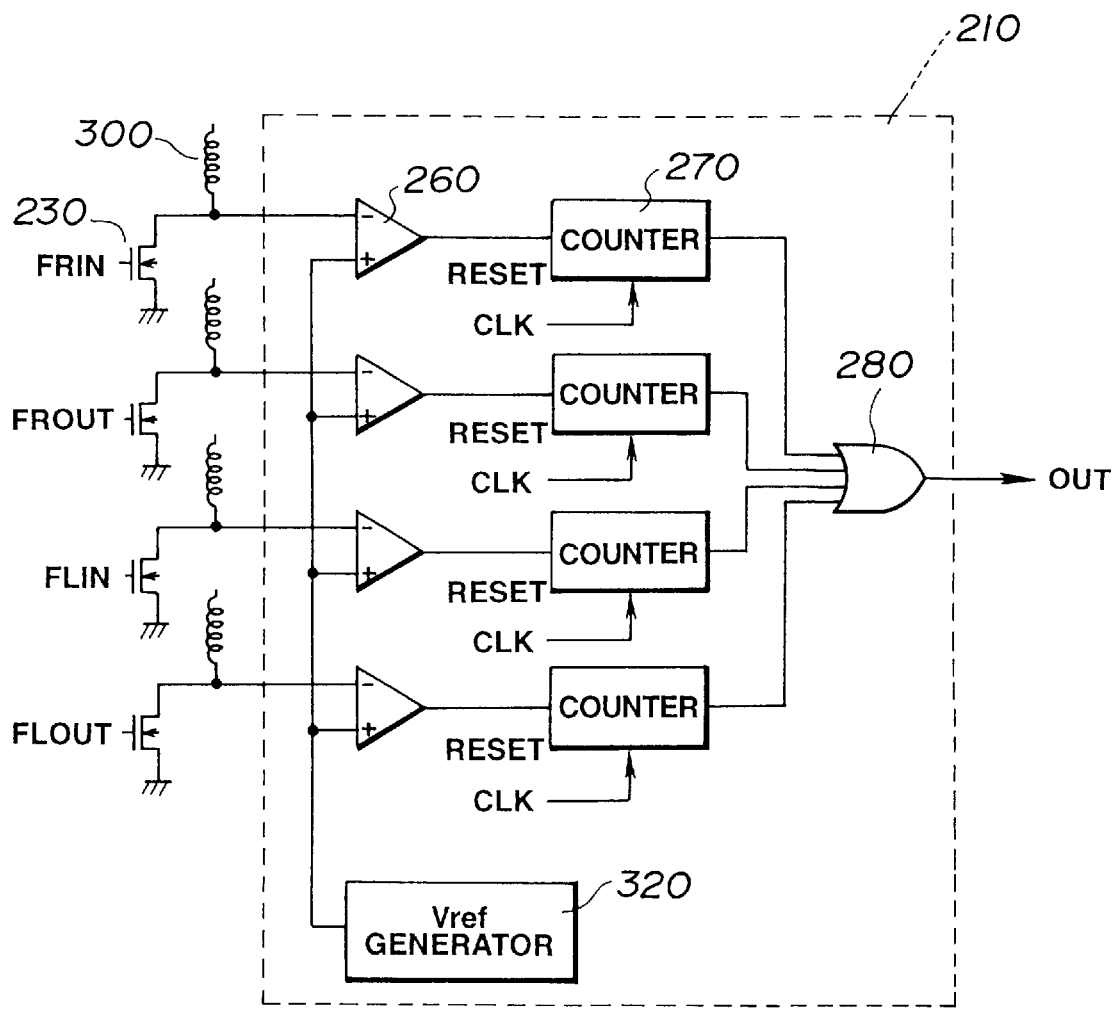
FIG. 8 is a block diagram of a related solenoid monitoring circuit.
Figure 9:
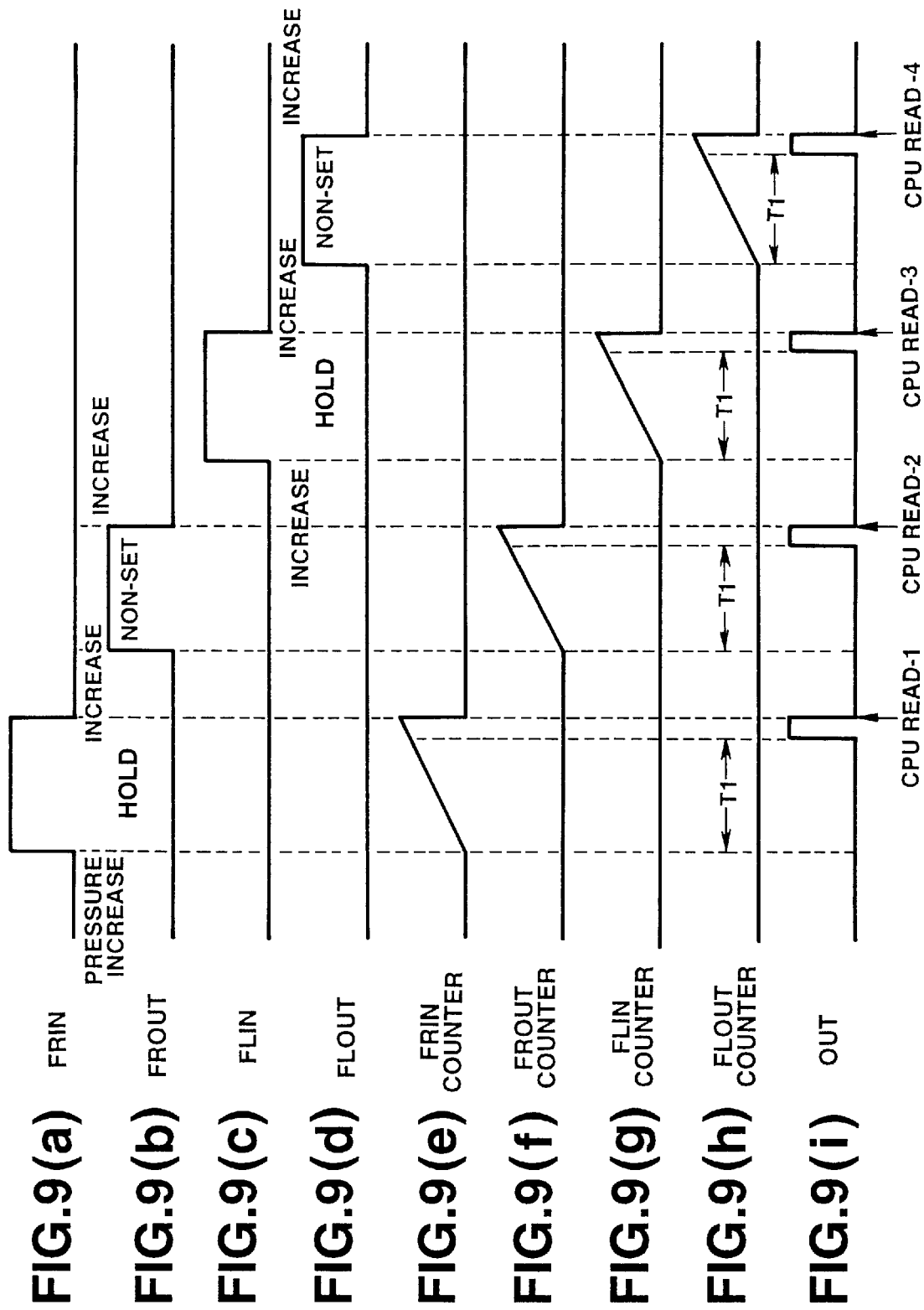
FIGS. 9(a) to 9(i) are time charts showing operations of the related solenoid monitoring circuit of FIG. 8.
Figure 10:
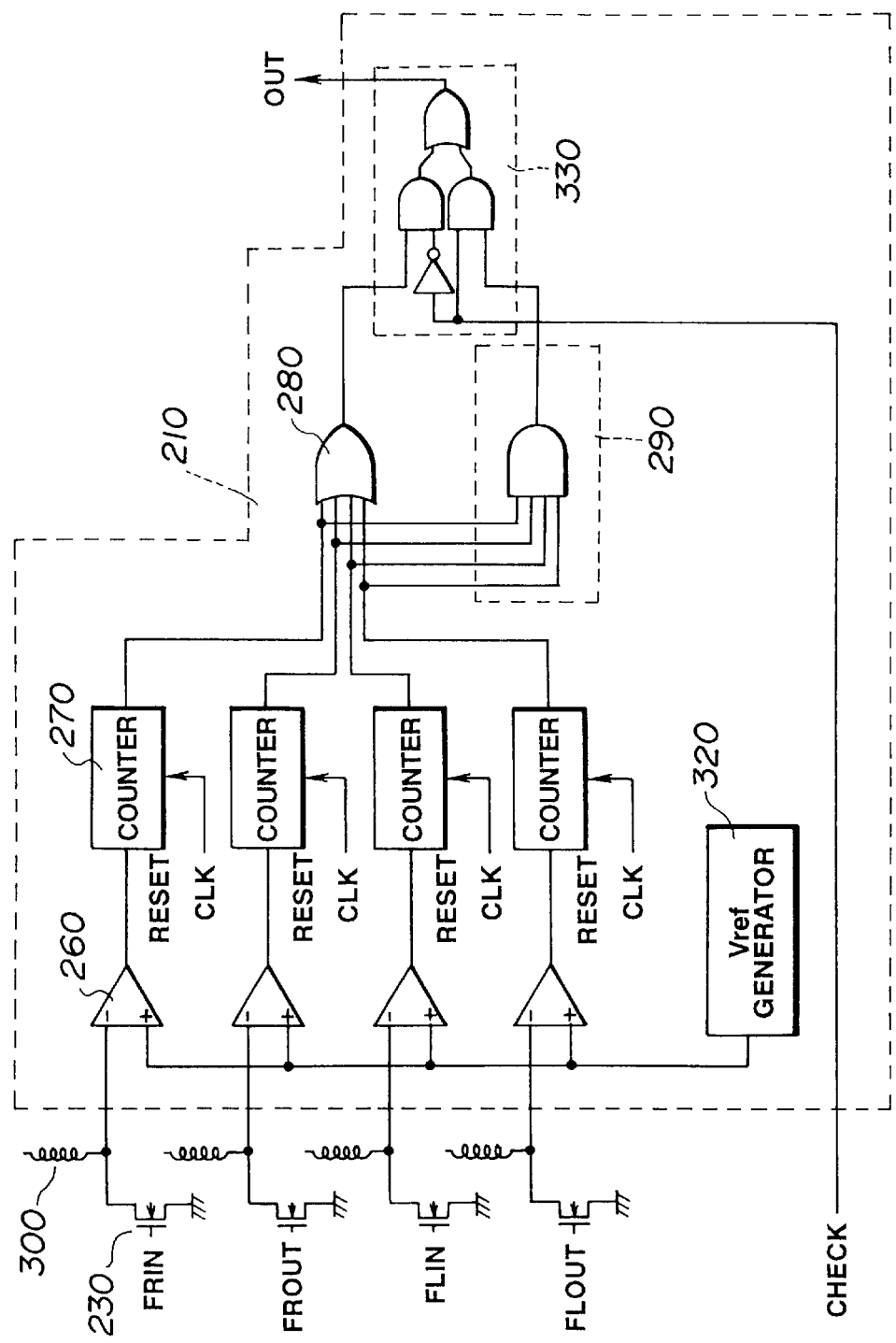
FIG. 10 is a block diagram of another conventional solenoid monitoring circuit.

Referring to FIG. 6, there is shown a second embodiment of the diagnosis apparatus according to the present invention.

As shown in FIG. 6, the second embodiment is generally similar to the first embodiment of FIG. 2 except that a clock signal to the counters 27 is supplied by two clocks (a normal clock and a diagnosis clock) CLK1 and CLK2. The two clock signals is changed by a CHECK signal of a clock switching circuit 33. The clock frequency of the clock CLK2 is set to be greater than a thousand times that of the clock CLK1 applied to the ABS control. Accordingly, although the normal monitoring time T1 is several seconds, the monitoring time T2 during the diagnosis becomes several mil seconds. As a result, a diagnosis period, that is, a time from a start-up of the FRIN, FROUT, FLIN and FLOUT to the output to the OUT terminal is greatly shortened.

What is claimed is:

1. An anti-lock braking system comprising:

a brake hydraulic unit including a holding solenoid valve which holds hydraulic pressure of said brake hydraulic unit and a decreasing solenoid valve which decreases the hydraulic pressure of said brake hydraulic unit;

a pair of solenoid drive circuits connected to the holding solenoid valves and the decreasing solenoid valves respectively, said solenoid drive circuits putting the holding solenoid valve and the decreasing solenoid valve in a turned-on condition respectively;

a holding-valve counter connected to the holding solenoid valve and counting a turned-on time of the holding solenoid valve, said holding-valve counter outputting a holding-valve signal when the turned-on time of the holding solenoid valve is greater than a predetermined time;

a decreasing-valve counter connected to the decreasing solenoid valve and counting a turned-on time of the decreasing solenoid valve, said decreasing-valve counter outputting a decreasing-valve signal when the turned-on time of the decreasing solenoid valve is greater than the predetermined time; and a decision circuit receiving the holding valve signal and the decreasing valve signal, said decision circuit generating a decision signal when both of the holding-valve signal and the decreasing-valve signal are inputted to said decision circuit.

2. An anti-lock braking system comprising:

a plurality of brake hydraulic units, each of said brake hydraulic units including a holding solenoid valve which holds hydraulic pressure of each brake hydraulic unit and a decreasing solenoid valve which decreases the hydraulic pressure of each brake hydraulic unit;

a plurality of solenoid drive circuits connected to the holding solenoid valves and the decreasing solenoid valves respectively, each of said solenoid drive circuits putting each of the holding solenoid valves and the decreasing solenoid valves in a turned-on condition respectively;

a plurality of holding-valve counters connected to the holding solenoid valves respectively, each of said holding-valve counters counting a turned-on time of the holding solenoid valve, said holding-valve counter outputting a holding-valve signal when the turned-on time of the holding solenoid valve is greater than a predetermined time;

a plurality of decreasing-valve counters connected to the decreasing valves respectively, each of said decreasing-valve counters counting a turned-on time of the decreasing solenoid valve, said decreasing-valve counter outputting a decreasing-valve signal when the turned-on time of the decreasing solenoid valve is greater than the predetermined time; and a decision circuit receiving the holding valve signal and the decreasing valve signal, said decision circuit generating a decision signal when both of the holding-valve signal and the decreasing-valve signal by each associated brake hydraulic unit are inputted to said decision circuit.

3. An anti-lock braking system as claimed in claim 2, further comprising a diagnosis signal generator which outputs a diagnosis signal to said solenoid drive circuits so as to put the holding solenoid valve and the decreasing solenoid valve by each brake hydraulic unit in the turned-on condition for more than the predetermined time, said decision circuit generating a signal indicative of normality of said brake hydraulic unit when both of the holding-valve signal and the decreasing-valve signal by each associated brake hydraulic unit are inputted to said decision circuit.

4. An anti-lock braking system as claimed in claim 3, further comprising:

a normal operation diagnosis circuit connected to said holding-valve counters and said decreasing-valve counters, said normal operation diagnosis circuit outputting an operation-diagnosis signal indicative of abnormality of the anti-lock braking system when at least one of the holding-valve signals and the decreasing-valve signals of said brake hydraulic unit is inputted to said normal operation diagnosis circuit; and a select circuit outputting the signal of said decision circuit only when said diagnosis signal generator outputs the diagnosis signal.

5. An anti-lock braking system as claimed in claim 4, further comprising a fail-safe means which forbids the operations of the holding solenoid valves and the decreasing solenoid valves when said normal operation diagnosis circuit outputs the operation-diagnosis signal.

6. An anti-lock braking system as claimed in claim 5, further comprising a delay timer connected to said select circuit, said delay timer forbidding the operation of said fail-safe means when said diagnosis signal generator outputs the diagnosis signal.

7. An anti-lock braking system as claimed in claim 6, further comprising an accelerated clock through which said counters executes counting when said diagnosis signal generator outputs the diagnosis signal.

8. An anti-lock braking system as claimed in claim 2, further comprising a diagnosis signal generator which outputs a diagnosis signal to said solenoid drive circuits by each brake hydraulic unit in turn.

9. An anti-lock braking system comprising:

a first brake hydraulic unit including a first-holding solenoid valve which, when turned on, holds hydraulic pressure of said first brake hydraulic unit and a first-decreasing solenoid valve which, when turned on, decreases the hydraulic pressure of said first brake hydraulic unit;

a second brake hydraulic unit including a second-holding solenoid valve which, when turned on, holds hydraulic pressure in said second brake hydraulic unit and a second-decreasing solenoid valve which, when turned on, decreases the hydraulic pressure in said second brake hydraulic unit;

a first-holding valve counter counting a turned-on time of said first-holding solenoid valve, said first-holding valve counter outputting a first-holding valve signal when the turned-on time of said first solenoid valve is greater than a predetermined time;

a first-decreasing valve counter counting a turned-on time of said first-decreasing solenoid valve, said first-decreasing valve counter outputting a first-decreasing valve signal when the turned-on time of the first-decreasing solenoid valve is greater than the predetermined time;

a second-holding valve counter counting a turned-on time of said first solenoid valve, said second-holding valve counter outputting a second-holding signal when the turned-on time of said second-holding solenoid valve is greater than a predetermined time;

a second-decreasing valve counter counting a turned-on time of said second-decreasing solenoid valve, said second-decreasing valve counter outputting a second-decreasing valve signal when the turned-on time of the second-decreasing solenoid valve is greater than the predetermined time;

a diagnosis signal generator outputting a first diagnosis signal to the first holding solenoid valve and the first decreasing solenoid valve by each brake hydraulic unit so as to put them in the turned-on condition for more than the predetermined time, said diagnosis signal generator outputting a second diagnosis signal to the second-holding solenoid valve and the second-decreasing solenoid valve by each brake hydraulic unit so as to put them in the turned-on condition for more than the predetermined time; and a decision circuit receiving the first-holding valve signal, the first-decreasing valve signal, the second-holding valve signal and the second-decreasing valve signal, said decision circuit generating a first signal indicative of normality of said first brake hydraulic unit when both of the first-holding valve signal and the first-decreasing valve signal are inputted to said decision circuit, said decision circuit generating a second signal indicative of normality of said second brake hydraulic unit when both of the second-holding valve signal and the second-decreasing valve signal are inputted to said decision circuit.

10. An anti-lock braking system s as claimed in claim 9, wherein said decision circuit executes the decision of the normality by each brake hydraulic unit when the anti-lock braking system is put in a diagnosis mode.

11. An anti-lock braking system as claimed in claim 9, further comprising a third brake hydraulic unit which includes a third-holding solenoid valve and a third-decreasing solenoid valve, a third-holding valve counter which outputs a third-holding valve signal when the turned-on time of said third-holding solenoid valve is greater than a predetermined time, and a third-decreasing valve counter which outputs a third-decreasing valve signal when the turned-on time of said third-holding solenoid valve is greater than a predetermined time, said decision circuit receiving the third-holding valve signal and the third-decreasing valve signal and generating a third signal indicative of normality of said third brake hydraulic unit when both of the third-holding valve signal and the third-decreasing valve signal are inputted to said decision circuit.

12. An anti-lock braking system as claimed in claim 9, further comprising a first-holding solenoid drive circuit through which the first holding solenoid valve is turned on, a first-decreasing solenoid drive circuit through which the first-decreasing solenoid valve is turned on, a second-holding solenoid drive circuit through which the second-holding solenoid valve is turned on and a second-decreasing solenoid drive circuit through which the second-decreasing solenoid valve is turned on.

13. An anti-lock braking system as claimed in claim 9, wherein said first brake hydraulic unit is applied to one of a pair of steered wheels of an automotive vehicle and said second brake hydraulic unit is applied to the other of the steered wheels.

14. A method for diagnosing an anti-lock braking system comprising the steps of:

applying a diagnosing signal to solenoid drive circuits for a holding solenoid valve and a decreasing solenoid valve of a brake hydraulic unit so that the holding solenoid valve and the decreasing solenoid valve are turned on for more than a predetermined time;

counting the turned-on time of each of the holding solenoid valve and the decreasing solenoid valve;

generating a first carry signal when the holding solenoid valve is turned on for more than the predetermined time;

generating a second carry signal when the decreasing solenoid valve is turned on for more than the predetermined time; and outputting a decision signal indicative of a normality of the brake hydraulic unit when both of the first and second carry signals are generated.

* * * * *